United States Patent
Marlor et al.

(10) Patent No.: US 6,373,193 B1
(45) Date of Patent: Apr. 16, 2002

(54) LONG LIFE HALOGEN CYCLE INCANDESCENT LAMP AND GLASS ENVELOPE COMPOSITION

(75) Inventors: Richard C. Marlor, Beverly, MA (US); Karin Naumann, Ober-Olm (DE); Franz Ott, Mitterteich (DE); Ottmar Becker, Langen (DE)

(73) Assignees: Osram Sylvania Inc., Danvers, MA (US); Schott Glas, Mainz (DE)

( * ) Notice: Subject to any disclaimer, the term of this patent is extended or adjusted under 35 U.S.C. 154(b) by 0 days.

(21) Appl. No.: 09/508,166

(22) PCT Filed: Sep. 10, 1998

(86) PCT No.: PCT/US98/18745

§ 371 Date: Mar. 8, 2000

§ 102(e) Date: Mar. 8, 2000

(87) PCT Pub. No.: WO99/14794

PCT Pub. Date: Mar. 25, 1999

Related U.S. Application Data

(60) Provisional application No. 60/058,712, filed on Sep. 12, 1997.

(30) Foreign Application Priority Data

Oct. 27, 1997 (DE) .......................................... 197 47 355

(51) Int. Cl.⁷ ............................................... H01J 61/35
(52) U.S. Cl. ...................... 313/636; 313/580; 313/579
(58) Field of Search ................................. 313/636, 579, 313/578, 580, 221; 501/67

(56) References Cited

U.S. PATENT DOCUMENTS

| | | |
|---|---|---|
| 3,961,970 A | 6/1976 | Morgan |
| 4,737,685 A | 4/1988 | Thomas |
| 5,473,226 A | 12/1995 | Beschle et al. |

*Primary Examiner*—Vip Patel
*Assistant Examiner*—Kenneth A Berck
(74) *Attorney, Agent, or Firm*—William H. McNeill; Robert F. Clark

(57) ABSTRACT

A long life, halogen cycle, incandescent lamp (30) for operation in excess of 85 volts. The lamp comprises a transparent glass envelope (34) having sealed therewithin a tungsten filament (45); a pair of electrical lead-ins (42, 44) connecting the filament and extending exteriorly of the envelope for connection to a supply voltage greater than 100 V; and a fill gas within the envelope, including a halogen, at a pressure of at least three atmospheres. The envelope is constructed of a five component alkaline earth aluminosilicate glass having a composition consisting essentially of, in weight percent from >58 to about 64% $SiO_2$, from about 14 to about 17% $Al_2O_3$; from 0 to about 1% $B_2O_3$; from 1 to about 6% MgO, from about 6 to about 12% CaO, from about 7 to about 17% BaO and from 0 to about 1.5% $ZrO_2$.

21 Claims, 1 Drawing Sheet

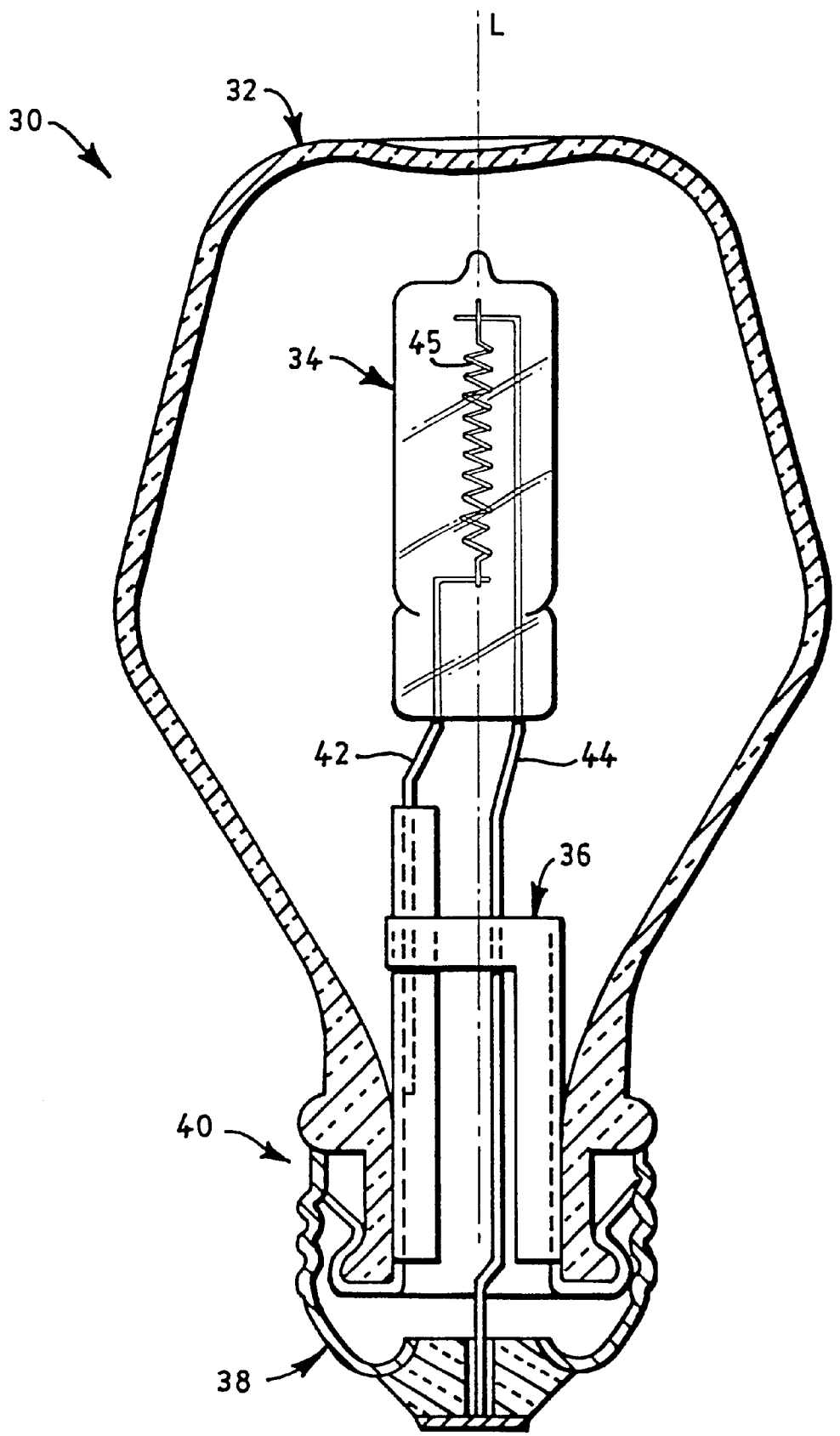

LONG LIFE HALOGEN CYCLE INCANDESCENT LAMP AND GLASS ENVELOPE COMPOSITION

This application claims the benefit of U.S. Provisional application No. 60/058,712, filed Sep. 12, 1997; U.S. Ser. No. 08/948,565, filed Oct. 10, 1997; and German Application No. 197 47 355.5, filed Oct. 27, 1997.

TECHNICAL FIELD

This invention relates to lamps and more particularly to incandescent halogen lamps. Still more particularly, it relates to a glass for the envelope of halogen lamps.

BACKGROUND ART

Lamps operating by a tungsten-halogen cycle are known. In operation, tungsten-halogen lamps contain a non-reactive gas filling such as neon, nitrogen, argon, krypton or xenon or a combination thereof, together with a halogen, usually bromine, which combines with the evaporated tungsten escaping from the incandescent filament. An equilibrium concentration is attained by the gaseous species within the lamp between the temperature limits defined by the incandescent filament and the coldest spot in the lamp envelope. The cold spot temperature must be sufficiently high to prevent any tungsten halide from condensing and, providing that this condition is met, a continuous transport cycle operates which keeps the envelope free from tungsten.

Numerous hard glasses, such as the aluminosilicates, have been employed with tungsten halogen lamps with varying degrees of success. Such glasses include Corning Incorporated nos. 1720, 1724 and 1725; glass nos. 8252 and 8253 available from Schott; no. 180 available from General Electric.

The 1720, 1724 and 8252 glasses have been used successfully with low voltage applications (i.e., 12 v), such as automobile headlamps which operate with wall temperatures below 500° C.; however, for line voltage applications, i.e., voltages greater than 85 v, with wall temperatures much greater than 500° C., these glasses prove unusable due to an inability to maintain good seals. This condition has been attributed to a structural compaction of the glass during operation. The compacted glass results in stresses, which can exceed the breaking strength of the glass, ultimately rupturing the lamp seal.

Other glasses, such as 1725, 180, and 8253, which all have substantially higher glass strain points, while employable with the higher wall temperatures generated by reduced envelope size and greater voltages, i.e., voltages in excess of 85 volts, will not fail from compaction but ultimately from blackening caused by the tungsten deposition on the inner bulb wall and, subsequently, in a non-passive lamp failure, i.e., the lamp capsule explodes. Ideally, lamp failure should be passive, i.e., by breakage of the filament. Typically, the halogen gas employed is either HBr or $CH_3Br$. As previously noted, the concentration of the bromine (or other halogen) is critical for controlling the halogen cycle with tungsten. While the glasses enumerated above work well initially, after a given period of time there is a reaction of the alkaline earth cations with the bulb wall, thus depleting the bromine from the halogen cycle. The reaction products typically are $BaBr_2$ and $CaBr_2$, which show as a white haze on the interior of the lamp envelope surface. Halogen lamps are typically designed with this reaction as a limiting factor in lamp performance.

It has been suggested that the alkaline earth reaction with bromine could be decreased by the application of a barrier coating of silica to the interior surface of the lamp envelope (see U.S. Pat. No. 5,473,226, assigned to the assignee of the instant invention); however, this solution is costly and not completely effective.

It would be an advance in the art if a glass could be developed which eliminated or substantially reduced the combination effect of the halogen with the glass material in lamps using power supplies of greater than 85 volts whereby the performance (through increased lumen maintenance) and life of the lamps could be improved; that is, extended to beyond 2500 hours without substantial deterioration in light output.

DISCLOSURE OF INVENTION

It is, therefore, an object of my invention to obviate the disadvantages of the prior art.

It is another object of my invention to enhance the performance of halogen cycle lamps.

Yet another object of my invention is the provision of a glass for tungsten halogen lamps, which delivers the above results and yet remains economical to manufacture.

These objects have been accomplished, in one aspect of the invention, by providing a long life, halogen cycle, incandescent lamp for operation in excess of 85 volts which comprises: a transparent glass envelope having sealed therewithin a tungsten filament; a pair of electrical lead-ins connecting the filament and extending exteriorly of the envelope for connection to a supply voltage greater than 85 v; and a fill gas within the envelope including a halogen, at a pressure of at least three atmospheres. The envelope is constructed of an alkaline earth aluminosilicate glass having a composition consisting essentially of, in weight percent, from >58 to about 64% $SiO_2$, from about 14 to about 17.5% $Al_2O_3$; from 0 to about 1% $B_2O_3$, from 1 to about 7% MgO, from about 5.5 to about 14% CaO, from about 6 to about 17% BaO, from 0 to about 8% SrO, and from 0 to about 1.5% $ZrO_2$. Trace amounts of other compounds such as $CeO_2$, or $TiO_2$ may be present in amounts less than 1% by weight. In a preferred aspect of the invention the envelope is constructed of an aluminosilicate glass having a reduced affinity for halogens comprising, in weight percent: from 59 to about 61% $SiO_2$, from about 15.3 to about 17.2% $Al_2O_3$; from about 0.3 to about 0.5% $B_2O_3$, from 1 to about 6.5% MgO, from about 5.9 to about 13.5% CaO, from about >6.5 to about 9.5% BaO, from 0 to about 8% SrO, from about 0.05 to about 1% $ZrO_2$, from about 0 to about 0.3% $CeO_2$, and from about 0 to about 0.5% $TiO_2$.

BRIEF DESCRIPTION OF THE DRAWINGS

The single FIGURE is a cross-sectional view of a tungsten halogen lamp employing the invention.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Referring now to the drawings with greater particularity, there is shown in the figure a lamp 30 having a longitudinal axis L and comprising an outer envelope 32 and an inner envelope 34, frame assembly 36, and a base 38. The outer envelope 32 has a neck portion 40. The inner envelope 34 is a tungsten halogen incandescent capsule with a filament 45 therein having electrical lead-ins 42 and 44 connected thereto and extending exteriorly of the body 34 for connection to a source of supply voltage greater than 85 v. The capsule 34 in this instance is mounted upon a frame 36.

The capsule 34 is constructed of the glass of this invention and contains a gaseous fill comprised of an inert gas and a halogen. In a preferred embodiment of the invention, the fill comprises 95% Kr, about 5% $N_2$ and 0.10% HBr and is at a pressure of 3–8 atmospheres.

The aluminosilicate glass of capsule 34 consists essentially of, in weight percent, from >58 to about 64% $SiO_2$, from about 14 to about 17.5% $Al_2O_3$, from 0 to about 1% $B_2O_3$, from about 1 to about 7% MgO, from about 5.5 to about 14% CaO, from about 6 to about 17% BaO, from 0 to about 8% SrO, and from 0 to about 1.5% $ZrO_2$. In a preferred embodiment of the invention the boron oxide and the zirconium oxide would be eliminated as they have no known effect on lamp operation; however, minor amounts may be necessary to aid in the melting process. It may also be advisable to include a minor amount of zinc oxide to control liquidus, as well as minor amounts of $CeO_2$ and/or $TiO_2$ to control the UV absorption edge. In glasses suitable for use in tanning lamps, up to 2-wt. % Br can be added. This will correspond to approximately up to 0.6 wt. % in the finished glass, based on the volatility of the compounds used (e.g., $BaBr_2$).

Some of the glasses of the invention were tested for bromine depletion against the prior art glasses in the following manner. A fused quartz reaction vessel having a length of about 5 inches and a diameter of about 5 inches was loaded with capsule glass tubing formed from various compositions of glass nos. 8253, 180, 1725, 1724, 1720 and the glass of my invention. The composition of these glasses is shown in Table I.

TABLE I

| Oxides | 1720 Corning | 1724 Corning | 8252 Schott | 1725 Corning | 180 GE | 8253 Schott |
|---|---|---|---|---|---|---|
| SiO2 | 60.63 | 57.2 | 60 | 63.4 | 62.1 | 61.9 |
| Al2O3 | 16.22 | 16.3 | 14.5 | 14.5 | 14.3 | 16.2 |
| B2O3 | 5.02 | 4.35 | 4.5 | 0.05 | 0 | 0.34 |
| MgO | 8.17 | 5.79 | 2.0 | 0.2 | 0 | 0.05 |
| CaO | 9.45 | 8.03 | 10.0 | 11.2 | 6.5 | 12.5 |
| BaO | | 8.07 | 9.0 | 10.4 | 16.8 | 7.7 |
| SrO | | 0 | | 0.2 | 0.2 | 0.1 |
| Na2O | 0.51 | 0.038 | | 0.03 | 0.02 | 0.08 |
| K2O | | 0.024 | | 0.02 | 0.01 | 0.01 |
| ZrO2 | | 0.16 | | 0 | 0 | 1.1 |
| Fe2O3 | | 0.048 | | 0.041 | 0.033 | 0.031 |
| TiO2 | | | | | 0.21 | |
| BaO/CaO [moles] | | 0.37 | 0.33 | 0.34 | 0.95 | 0.22 |
| MgO/CaO [moles] | 1.20 | 1.00 | 0.28 | | | |
| Molar % RO | 23.0 | 22.4 | 19.2 | 18.3 | 16.1 | 18.5 |
| Physical Properties | | | | | | |
| Softening Point [° C.] | 915 | 926 | 940 | 993 | 1020 | 1000 |
| Anneal Point [° C.] | 712 | 726 | 725 | 778 | 786 | 783 |
| Strain Point [° C.] | 668 | 674 | | 716 | 733 | 733 |

TABLE I-continued

| Oxides | 1720 Corning | 1724 Corning | 8252 Schott | 1725 Corning | 180 GE | 8253 Schott |
|---|---|---|---|---|---|---|
| Thermal Expansion 23–300 C. [x10 − 7/ C.] | 42 | 44 | 46 | 45 | 43 | 45 |
| Density [g/cc] | 2.52 | 2.56 | 2.63 | 2.72 | 2.68 | 2.62 |

The quartz reaction vessel was evacuated, backfilled with a gas consisting of about 80% Kr, 19% N and 1% HBr at a pressure of 1 atmosphere, and sealed. The reaction vessel was placed in an isothermal portion of an oven and heated at 610° C. for 500 hours. After cooling, the reaction vessel was opened, the test glass tubing removed, stoppered at one end and filled with deionized water. The opposite end was then stoppered and the capsule tubing were heated to 100° C. for one hour to dissolve the water soluble reaction products formed on the inner surfaces of the capsule cylinders. The water content of each of the capsule tubes was then analyzed for bromine, calcium, magnesium, barium, strontium (one of the glass samples had a small amount of CaO replaced by SrO), and sodium. The results are shown in Table II.

TABLE II

| | Concentration in original solution in millimoles/liter | | | | | |
|---|---|---|---|---|---|---|
| Description | Br | Ba | Ca | Mg | Sr | Na |
| 8253, Partial Substitution of SrO for CaO | 0.390 | 0.036 | 0.083 | 0.000 | 0.062 | 0.019 |
| GE 180, Production Composition | 0.388 | 0.109 | 0 060 | 0.000 | 0.004 | 0.007 |
| 8253, Without ZrO2 and B2O3 | 0.348 | 0.023 | 0.146 | 0.000 | 0.001 | 0.010 |
| 8253D, Production Composition | 0.319 | 0.020 | 0.135 | 0.000 | 0 002 | 0.011 |
| 8253, Without ZrO2 | 0.229 | 0.018 | 0.124 | 0.000 | 0.001 | 0.007 |
| 8253, Lower Alkali Production Glass | 0.189 | 0.008 | 0.061 | 0.000 | 0.000 | 0.006 |
| 1725, Production Composition | 0.154 | 0.032 | 0.099 | 0.000 | 0.002 | 0.012 |
| 1724, Lab Melt | 0.035 | 0.007 | 0.008 | 0.001 | 0.000 | 0.003 |
| 8253, Partial Substitution of MgO for CaO | 0.034 | 0.007 | 0.009 | 0.001 | 0.000 | 0.003 |
| 1724, Production Composition | 0.030 | 0.006 | 0.007 | 0.001 | 0.000 | 0.003 |
| 1720, Production Composition [0.5 wt % alkali] | 0.012 | 0.000 | 0.006 | 0.001 | 0.000 | 0.005 |
| 8253D, No HBr Treatment [Control] | 0.002 | 0.000 | 0.004 | 0.000 | 0.000 | 0.002 |

One of the glasses of this invention is shown in Table II as "8253, Partial Substitution of MgO for CaO". It will be seen that this glass, under identical test conditions, had far less bromine reaction than any of the other high temperature glasses. The lower temperature glasses, i.e., 1720 and 1724, also had low bromine contamination as was expected from their use in low voltage applications; however, as noted above, these glasses cannot be used in high voltage applications because of their low glass strain points which results in structural compaction and, ultimately, in the lamp failing nonpassively when cracks develop at the inner glass-inlead wire interface.

Other glasses of the invention were prepared as follows:

EXAMPLES

Alkali-poor variants were used each time for the production of the example glasses, such as quartz sand, aluminum oxide, magnesium carbonate, calcium carbonate and barium carbonate, as well as zirconium sand. If desired, cerium oxide and barium bromide can be added. The well-homogenized mixtures were melted in the laboratory in a Pt/Rh crucible at 1600–1650° C., refined and homogenized. The glass was drawn perpendicularly in a laboratory pulling device. The glasses were free of disruptive small crystals. Table III shows an example of a glass (A5) according to an aspect of the invention as well as a comparative example (V1) with their compositions (in wt. % based on the oxides) and their essential properties.

The reboil temperature is indicated along with the transformation temperature ($T_g$). The reboil temperature is the temperature at which a visually bubble-free glass sample at room temperature suddenly shows bubble formation at the interface with a metal (sample holder, Mo) when the temperature is increased. The higher this reboil temperature lies, the less the glass tends toward bubble formation when sealed to Mo. In the comparison example the upper cooling point (UCP) is indicated in place of $T_g$.

Tungsten-halogen lamps with high power were prepared from glass tubes in the usual way for a lamp test. These were subjected to a continuous operation at a bulb temperature of 700° C. The time period prior to the beginning of blackening on the inside of the glass bulb was determined. The value for A5 is also sufficiently good. In the case of V1, a bulb bulging occurred.

TABLE III

|  | A5 | V1 |
|---|---|---|
| $SiO_2$ | 60.7 | 56.8 |
| $Al_2O_3$ | 16.5 | 16.4 |
| $B_2O_3$ | 0.3 | 4.7 |
| MgO | 5.7 | 5.8 |
| CaO | 7.8 | 7.8 |
| SrO | — | — |
| BaO | 8.0 | 8.0 |
| $ZrO_2$ | 1.0 | — |
| $CeO_2$ | — | — |
| Br | — | — |
| $Na_2O$ | 0.011 | 0.028 |
| $K_2O$ | 0.006 | 0.018 |
| $H_2O$ [wt. %] | 0.01 | 0.017 |
| $\sigma_{20/300}$ [$10^{-6}$/K] | 4.37 | 4.52 |
| $T_9$ [° C.] | 781 | 721 (UCP), n.d. |
| Reboil temp. [° C.] | 1490 |  |

Additionally, it is preferred that the sum of the alkaline-earth oxides (RO) not be below 21 wt. % nor above 24 wt. %. Outside of these ranges both the thermal expansion and the viscosity have been found to deviate from the desired values.

Further, the weight ratio between the sum of CaO, sRO and MgO, on the one hand, and BaO on the other hand ((CaO+SrO+MgO)/BaO) shall amount to between 1.45 and 1.75. Preferably, it amounts to between 1.65 and 1.75.

Also, it is believed that the weight ratio of MgO to CaO is important; therefore, MgO/CaO will be always be greater than 0 and, preferably, less than about 0.8; otherwise, the crystallization stability of the glass would not be adequate for tube pulling.

It is believed that the advantages of this invention arise because the ionic transport is slower for the triple, mixed alkaline earth oxides (BaO, CaO, MgO) than for tile double alkaline earth oxides (BaO, CaO) systems employed in the prior art glasses previously used for high voltage lamps, i.e., GE 180, Corning 1725 or Schott 8253. Also important in the manufacture of the glass of this invention is the elimination or reduction to the absolute minimum of alkali contamination, that is, the presence of sodium, lithium and/or potassium should be kept below 0.05% by weight. Thus, there is provided by this invention a five component alumino-silicate system ($SiO_2$, $Al_2O_3$, BaO, CaO, MgO) with distinct advantages over the prior art, namely in its lack of bromine reaction products at the inner surface of a lamp operating under the halogen cycle, thereby permitting longer operation with better maintenance. Additionally, nonpassive failures are reduced or eliminated as the lamp burns cleanly until a normal end of life is achieved.

While there have been shown and described what are at present considered the preferred embodiments of the invention, it will be apparent to those skilled in the art that various changes and modifications can be made herein without departing from the scope of the invention as defined by the appended claims.

What is claimed is:

1. A long life, halogen cycle, incandescent lamp for operation in excess of 85 volts comprising: a transparent glass envelope having sealed therewithin a tungsten filament; a pair of electrical lead-ins connecting said filament and extending exteriorly of said envelope for connection to a supply voltage greater than 85 v; and a fill gas within said envelope including a halogen at a pressure of at least three atmospheres, said envelope being constructed of an alkaline earth aluminosilicate glass having a composition consisting essentially of, in weight percent, from >58 to about 64% $SiO_2$, from about 14 to about 17.5% $Al_2O_3$; from 0 about 1% $B_2O_3$, from 1 to about 7% MgO, from about 5.5 to about 14% CaO, from about 6 to about 17% BaO and from 0 to about 1.5% $ZrO_2$ and wherein the weight ratio of (CaO+SrO+MgO)/BaO is between 1.45 and 1.75.

2. The lamp of claim 1 wherein said halogen is bromine.

3. The lamp of claim 1 wherein said pressure is up to about 8 atmospheres.

4. The lamp of claim 3 wherein said lamp, when operating, has a wall temperature greater than 500° C.

5. The lamp of claim 4 wherein said envelope composition includes a minor amount of ZnO to control liquidus.

6. The lamp of claim 5 wherein said fill gas includes an inert gas.

7. The lamp of claim 6 wherein said halogen is bromine.

8. An aluminosilicate glass having a reduced affinity for halogens, comprising, in weight percent: from >58 to about 64% $SiO_2$, from about 14 to about 17.5% $Al_2O_3$; from about 0 to about 1% $B_2O_3$, from 1 to about 7% MgO, from about 5.5 to about 14% CaO, from about 6 to about 17% BaO, and from 0 to about 8% SrO and wherein the weight ratio of (CaO+SrO+MgO)/BaO is between 1.45 and 1.75.

9. The glass of claim 8 wherein said composition has up to about 1% $B_2O_3$.

10. The glass of claim 9 wherein said composition has up to about 1.5% $ZrO_2$.

11. The glass of claim 10 wherein a minor amount of ZnO replaces a minor amount of CaO to control the liquidus.

12. An alkaline-earth aluminosilicate glass consisting essentially of, in wt. % based on the oxides, >58 to about 64% $SiO_2$, from about 14 to about 17.5% $Al_2O_3$; from 0 to about 1% $B_2O_3$, from 1 to about 7% MgO, from about 5.5 to about 14% CaO, from about 6 to about 17% BaO, from 0 to about 1.5% $ZrO_2$, and from 0 to about 8% SrO and wherein the weight ratio of (CaO+SrO+MgO)/BaO is between 1.45 and 1.75.

13. The glass of claim 12 wherein the sum of the alkaline-earth oxides is not below 21 wt. % nor above 24 wt. %.

14. The glass of claim 12 wherein said weight ratio is between 1.65 and 1.75.

15. The glass of claim 12 wherein said glass has an alkali oxide content of <0.03 wt. % and a water content of <0.02 wt. %.

16. The lamp of claim 1 wherein said $B_2O_3$ is present in an amount of 0.2 to 0.7 wt. %.

17. The lamp of claim 1 wherein the amount of $ZrO_2$ is from 0.05 to 1 wt. %.

18. An aluminosilicate glass having a reduced affinity for halogens, comprising, in weight percent: from >58 to about 64% $SiO_2$, from about 14 to about 17.5% $Al_2O_3$; from about 0 to about 1% $B_2O_3$, from 1 to about 7% MgO, from about 5.5 to about 14% CaO, from about 6 to about 17% BaO, from about 0 to about 8% SrO, from about 0 to about 1.5% $ZrO_2$, from about 0 to about 0.3% $CeO_2$, and from about 0 to about 0.5% $TiO_2$ and wherein the weight ratio of (CaO+SrO+MgO)/BaO is between 1.45 and 1.75.

19. An aluminosilicate glass having a reduced affinity for halogens, comprising, in weight percent: from 59 to about 61% $SiO_2$, from about 15.3 to about 17.2% $Al_2O_3$; from about 0.3 to about 0.05% $B_2O_3$, from 1 to about 6.5% MgO, from about 5.9 to about 13.5% CaO, from about >6.5 to about 9.5% BaO, from about 0 to about 8% SrO, from about 0.05 to about 1% $ZrO_2$, from about 0 to about 0.3% $CeO_2$, and from about 0 to about 0.5% $TiO_2$ and wherein the weight ratio of (CaO+SrO+MgO)/BaO is between 1.45 and 1.75.

20. An aluminosilicate glass having a reduced affinity for halogens, comprising, in weight percent: about 60.7% $SiO_2$, about 16.5% $Al_2O_3$; about 0.3% $B_2O_3$, about 5.7% MgO, about 7.8% CaO, about 8% BaO, about 1% $ZrO_2$, from about 0 to about 0.3% $CeO_2$, and from about 0 to about 0.5% $TiO_2$.

21. The lamp of claim 1 wherein said envelope also includes from >0 to about 8% SrO.

* * * * *